Patented May 26, 1942

2,284,276

UNITED STATES PATENT OFFICE 2,284,276

QUICK DRYING INTAGLIO MARKING COMPOSITION

David M. Gans, Bronx, N. Y., assignor to Interchemical Corporation, New York, N. Y., a corporation of Ohio No Drawing. Application June 22, 1939, Serial No. 280,521

6 Claims. (Cl. 106—20)

This invention relates to quick drying intaglio marking compositions designed for application by intaglio cylinders, and has particular reference to intaglio inks, the vehicles of which comprise essentially water solutions of alkali metal silicates of high silicate/alkali oxide ratios. Specifically, my invention consists in the utilization of paratoluidine in such inks, for the purpose of producing prints of good appearance.

The water soluble alkali metal silicates have been suggested in the past as binders for intaglio inks, but have never been used commercially. A tendency to dry rather slowly, particularly in bad weather, has been a principal objection to their use. A second objection has been their lack of finish when pigmented to obtain covering in customary intaglio ink films (5 to 20 microns thick); ordinarily, a dull water color effect is obtained. A third objection has been the water sensitivity of the resultant prints.

It has been proposed to overcome these objections to conventional alkali silicate printing inks by using as the vehicle aqueous solutions of an alkali silicate in which the ratio of silicate to alkali oxide is 3.4 to 1.0 or higher, maintaining the silicate content of the vehicle within twelve percent or less of that at which gelation of the ink occurs. Such silicates, in water solution, change body slowly on loss of water, until this gel point is approached, when the body rises so sharply that a solid is obtained by the loss of an additional small increment of water. Silicate solutions of this type, with a silicate content close to the gel point, set up almost instantaneously on paper, due to the absorption of a small amount of water by the paper; this rapid setting causes concentration of silicate at the surface, and permits good finish to be obtained; and the films are reasonably waterproof. However, the rather concentrated silicate vehicles, when used with many pigments, print rather poorly from an intaglio cylinder, and give a mottled effect which is rather objectionable. This effect, while most noticeable with concentrated silicate solutions having a silica/alkali ratio of 3.4 to 1.0 or higher, is also noticeable to a certain extent with other less desirable silicate solutions.

I have discovered that acceptable intaglio prints may be obtained from inks having alkali silicate vehicles, by incorporating into the ink a small amount of paratoluidine. Small fractions of a percent have a noticeable effect where mottling is bad, and 1% appears to have as much effect as more, although additional paratoluidine seems to have no ill effects.

Typical examples of my invention are the following:

Example 1

| | Parts by weight |
|---|---|
| Carbon black | 3.0 |
| Powdered paratoluidine | 1.0 |
| Potassium silicate solution (27% solids—$SiO_2/K_2O$ ratio 3.9 to 1.0) | 96.0 |

The ingredients are mixed and passed through a colloid mill. The paratoluidine not only converts the previously mottling ink to one substantially free of mottle, but it intensifies the color of the black, giving it a bluer tone.

Example 2

| | Parts by weight |
|---|---|
| Barium lithol toner | 4.0 |
| Powdered paratoluidine | 1.0 |
| Sodium silicate solution (31% solids—$SiO_2/Na_2O$ ratio 3.9 to 1.0) | 95.0 |

The ink is prepared as in Example 1.

I have found no other chemicals which yield the peculiar improvement noticeable with paratoluidine—even ortho-toluidine does not improve the mottling.

While I have shown my invention as applied to only two silicate solutions, it is of general benefit wherever mottling occurs with silicate intaglio compositions.

I claim:

1. A quick drying intaglio marking composition comprising a dispersion of pigment in an aqueous alkali silicate solution, in which the silicate has a silica/alkali oxide ratio of from 3.4 to 1.0 to about 3.9 to 1.0, and a silicate content within 12% of the gel point, the dispersion being of such a character that prints made from it are mottled, and a small percentage of paratoluidine sufficient to reduce substantially the mottling obtained when depositing the composition from an intaglio cylinder without the paratoluidine.

2. A quick drying intaglio marking composition, comprising a dispersion of pigment in an aqueous potassium silicate solution, in which the silicate has a silica/potassium oxide ratio of 3.9 to 1.0 and a solids content of about 27%, the dispersion being of such a character that prints made from it are mottled, and a small percentage of paratoluidine sufficient to reduce substantially the mottling obtained when depositing the composition from an intaglio cylinder without the paratoluidine.

3. A quick drying intaglio marking composition, comprising a dispersion of pigment in an aqueous alkali silicate solution, in which the silicate has a silica/alkali oxide ratio of between 3.4 to 1.0 and 3.9 to 1.0 and a solids content of from about 27% to about 31%, the dispersion being of such a character that prints made from it are mottled, and a small percentage of paratoluidine sufficient to reduce substantially the mottling obtained when depositing the composition from an intaglio cylinder without the paratoluidine.

4. A quick drying intaglio marking composition comprising a dispersion of pigment in an aqueous alkali silicate solution, and 1% of paratoluidine, the silicate having a silica/alkali oxide ratio of between 3.4 to 1.0 and 3.9 to 1.0 and a solids content of from about 27% to about 31%.

5. A composition adapted for application by intaglio cylinder comprising a dispersion of pigment in an aqueous alkali silicate solution, in which the silicate has a silica/alkali oxide ratio of 3.4 to 1, and a silicate content within 12% of the gel point, the dispersion being of such a character that prints made from it are mottled, and a small percentage of paratoluidine sufficient to substantially reduce the mottling obtained when depositing the composition from an intaglio cylinder without the paratoluidine.

6. A composition adapted for application by intaglio cylinder comprising a dispersion of carbon black in an aqueous alkali silicate solution, in which the silicate has a silica/alkali oxide ratio of 3.4 to 1, and a silicate content within 12% of the gel point, the dispersion being of such a character that prints made from it are mottled, and a small percentage of paratoluidine sufficient to substantially reduce the mottling obtained when depositing the composition from an intaglio cylinder without the paratoluidine.

DAVID M. GANS.